United States Patent
Shaheen et al.

(10) Patent No.: US 7,035,242 B2
(45) Date of Patent: Apr. 25, 2006

(54) METHOD AND APPARATUS FOR DELIVERY OF UNIVERSAL MOBILE TELECOMMUNICATIONS SYSTEM (UMTS) BASED UNIDIRECTIONAL SERVICES OVER A WIRELESS LOCAL AREA NETWORK (WLAN)

(75) Inventors: Kamel M. Shaheen, King of Prussia, PA (US); Leonid Kazakevich, Plainview, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 111 days.

(21) Appl. No.: 10/302,143

(22) Filed: Nov. 22, 2002

(65) Prior Publication Data

US 2004/0017787 A1 Jan. 29, 2004

Related U.S. Application Data

(60) Provisional application No. 60/399,349, filed on Jul. 29, 2002.

(51) Int. Cl.
*H04Q 7/24* (2006.01)
*H04J 3/16* (2006.01)

(52) U.S. Cl. ................................ 370/338; 370/467
(58) Field of Classification Search ................ 370/318, 370/338, 382, 401, 465–469, 474
See application file for complete search history.

(56) References Cited

U.S. PATENT DOCUMENTS

| 5,796,727 | A | * | 8/1998 | Harrison et al. ............ 370/338 |
| 5,890,055 | A | * | 3/1999 | Chu et al. .................... 455/16 |
| 5,946,634 | A | * | 8/1999 | Korpela ...................... 370/466 |
| 6,151,495 | A | * | 11/2000 | Rune .......................... 455/461 |
| 6,181,683 | B1 | * | 1/2001 | Chevillat et al. ........... 370/329 |
| 6,259,898 | B1 | * | 7/2001 | Lewis ......................... 370/338 |
| 6,385,451 | B1 | | 5/2002 | Kalliokulju et al. |
| 6,393,261 | B1 | | 5/2002 | Lewis |

(Continued)

FOREIGN PATENT DOCUMENTS

CN 1304587 7/2001

(Continued)

OTHER PUBLICATIONS

ETSI TR 101 957 v1.1. (Aug. 2001) BRAN; HIPERLAN Type 2; Requirements and Architecture for Interworking between HIPERLAN/2 and 3rd Generation Cellular systems.*

(Continued)

*Primary Examiner*—Andrew C. Lee
(74) *Attorney, Agent, or Firm*—Volpe and Koenig, P.C.

(57) ABSTRACT

Method and apparatus for delivery of UMTS services to a dual mode mobile station through a WLAN when the mobile station is operating within a WLAN environment. UMTS services are transmitted to a WLAN through a UMTS repeater tuned to receive services addressed to registered IDs and transmit these services to that (those) WLAN(s) having mobile stations registered with the UMTS. The WLAN format converter converts the UMTS format into a WLAN message format and communicates the message to the registered users.

12 Claims, 2 Drawing Sheets

U.S. PATENT DOCUMENTS

| | | | |
|---|---|---|---|
| 6,650,899 B1 * | 11/2003 | Stumpert | 455/436 |
| 6,735,443 B1 | 5/2004 | Chandra et al. | |
| 6,763,012 B1 * | 7/2004 | Lord et al. | 370/338 |
| 6,763,236 B1 | 7/2004 | Siren | |
| 6,785,535 B1 | 8/2004 | Lucidarme et al. | |
| 6,795,437 B1 | 9/2004 | Rasanen et al. | |
| 6,807,417 B1 | 10/2004 | Sallinen et al. | |
| 6,834,050 B1 * | 12/2004 | Madour et al. | 370/392 |
| 6,904,055 B1 * | 6/2005 | Pichna et al. | 370/467 |
| 2002/0037717 A1 | 3/2002 | Laube et al. | |

FOREIGN PATENT DOCUMENTS

| | | |
|---|---|---|
| CN | 1304587 A | 7/2001 |
| EP | 1085773 | 9/1999 |
| EP | 1085773 A | 9/1999 |
| WO | 01/72076 | 9/2001 |
| WO | 02/15598 | 2/2002 |
| WO | 0215598 A | 2/2002 |
| WO | 02/043272 | 5/2002 |
| WO | 0243272 | 5/2002 |
| WO | 02/103929 | 12/2002 |
| WO | 02103929 A1 | 12/2002 |

OTHER PUBLICATIONS

IEEE Mar. 2002, "Design and Evaluation of UMTS-WLAN Interworking Strategies" Shiao-Li Tsao et al.*

ETSI TR 957 v1.1., "BRAN; HIPERLAN Type 2; Requirements and Architecture for Interworking Between HIPERLAN/2 and $3^{rd}$ Generation Cellular Systems", European Telecommunications Standards Institute, Aug. 2001.

Tsao et al., "Design and Evaluation of UMTS-WLAN Interworking Strategies", IEEE, pp. 777-781, Mar. 2002.

Bertin et al., "Concepts for IP-based Radio Interference in the BRAIN Framework", IEEE, 2000, pp. 437-444.

Lenzini et al., "Performance Evaluation of HiperLAN Type 2 with Voice and Web Data Traffic", Proceedings of the $34^{th}$ Hawaii International Conference on System Sciences, 2001, IEEE, pp. 1-10.

* cited by examiner

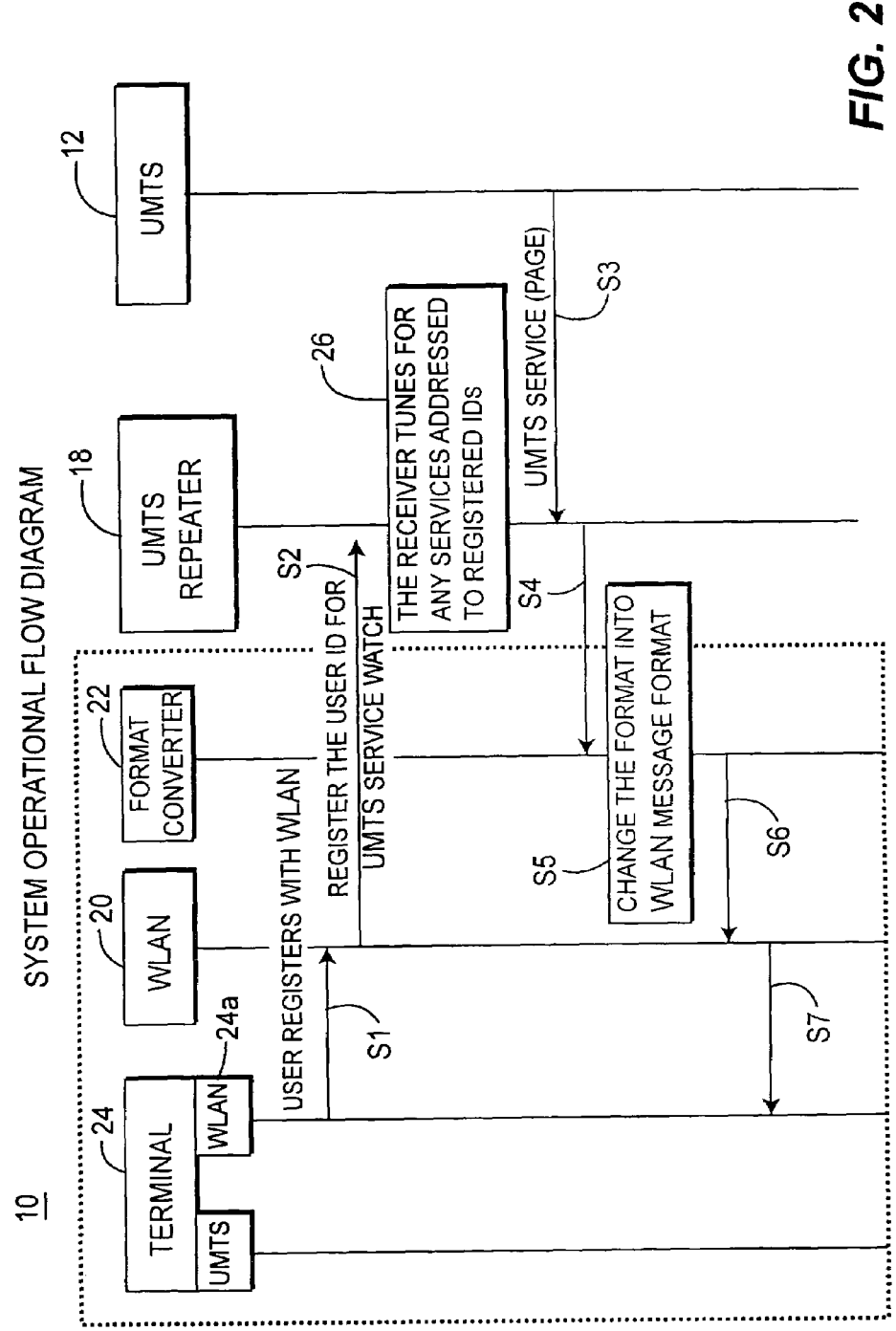

METHOD AND APPARATUS FOR DELIVERY OF UNIVERSAL MOBILE TELECOMMUNICATIONS SYSTEM (UMTS) BASED UNIDIRECTIONAL SERVICES OVER A WIRELESS LOCAL AREA NETWORK (WLAN)

CROSS REFERENCE TO RELATED APPLICATION

This application claims priority from U.S. Provisional Patent Application No. 60/399,349, filed Jul. 9, 2002, which is incorporated by reference as if fully set forth.

FIELD OF INVENTION

The present invention relates to wireless communication systems. More particularly, the present invention relates to method and apparatus for unidirectional delivery of services.

BACKGROUND

The present invention has the objective of delivering UMTS based services while a mobile station is attached to a wireless local area network (WLAN) system.

The applicant is unaware of any prior art capability of supporting such activities.

SUMMARY

The present invention is employed within a wireless communication system characterized by comprising a UMTS receiver that acts as a repeater for UMTS signals and a format converting unit for translating between UMTS formats and WLAN formats. The invention is employed within a network having both a UMTS system and a WLAN system. The system accommodates stand-alone mobile stations having a dual mode capability of selectively operating in UMTS and WLAN environments. A mobile station (UE) operating in the WLAN environment registers with the WLAN system and provides its UMTS identification for tracking UMTS traffic.

The WLAN forwards the mobile station identification (ID) to the UMTS receiver unit which is tuned for any activities involving the mobile station (UE). The UMTS receiver forwards any traffic, for example, paging messages, short message service (SMS), multimedia message service (MMS) and so forth, addressed to one of the registered mobile stations in the associated WLAN system serving the registered mobile stations. Traffic is forwarded to a unit that translates the message formats of the received traffic (flows) into WLAN formats which is then forwarded to the WLAN system. The WLAN system then forwards the traffic to the corresponding access point (AP) serving the mobile station.

The UMTS receiver forwards any traffic (e.g., paging messages, short message service (SMS) multimedia message service (MMS) and the like) address to the registered mobile station(s) through the associated WLAN system serving that (those) mobile station(s). The message is transferred through the converging layer 34 to the access point (AP) 36 servicing the mobile station, see FIG. 1.

BRIEF DESCRIPTION OF THE FIGURES

The present invention will be understood from a consideration of the accompanying Figures wherein like elements are designated by like numerals and, wherein:

FIG. 2 is a flow diagram useful in explaining the manner of operation of the present invention.

DETAILED DESCRIPTION OF THE PREFERRED EMBODIMENTS

Figure 1:
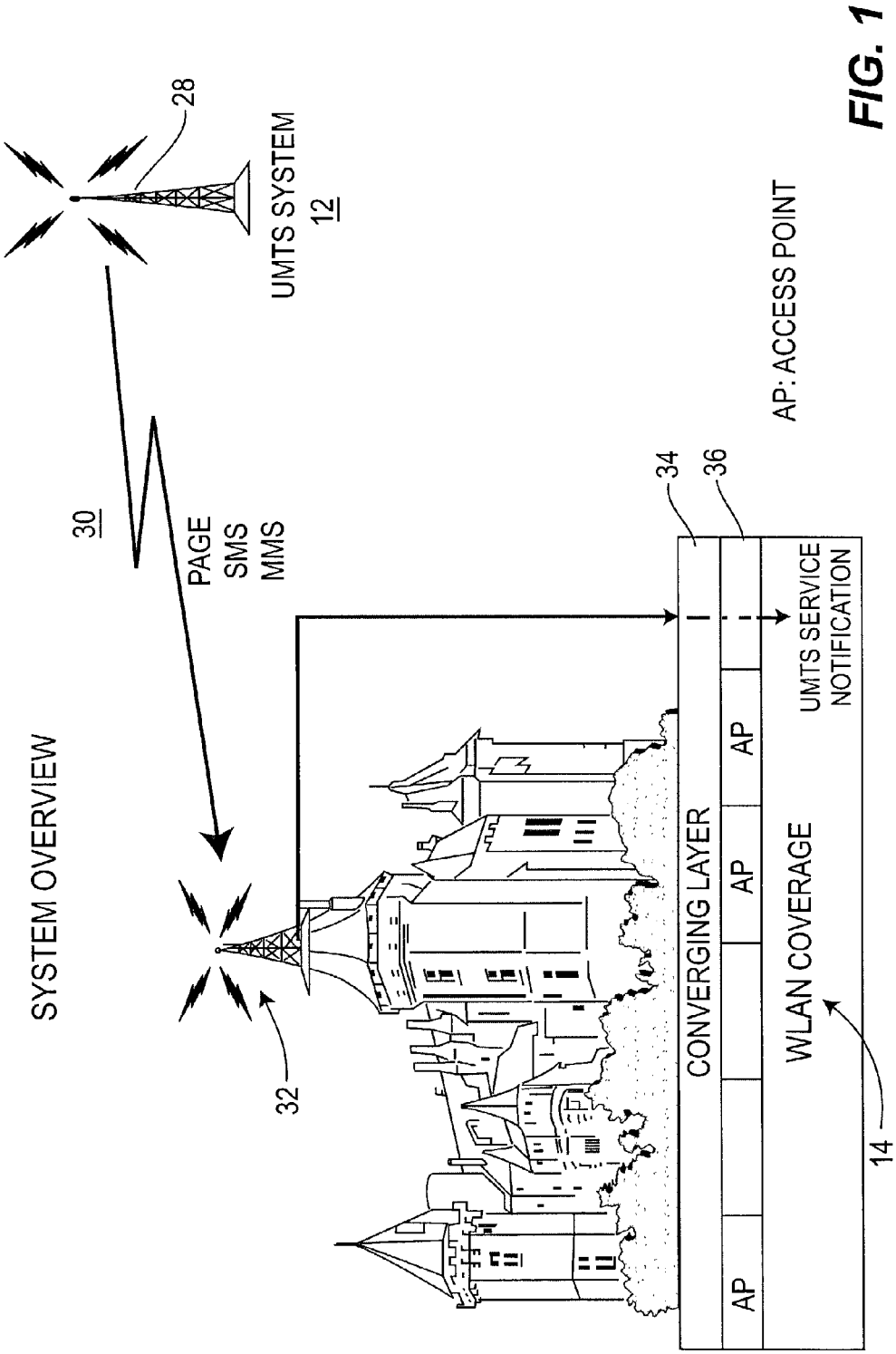
FIG. 1 is a diagram showing a UMTS system with an underlayed WLAN system and which is useful in describing the features and operation of the present invention.

FIG. 1 shows an arrangement 10 of a UMTS system 12 with an underlayed WLAN system 14. The arrangement of FIG. 1 will be described in conjunction with the technique for delivery of UMTS-based services when a mobile station is served by the WLAN system.

Making reference to FIG. 2, and where appropriate, FIG. 1, there is shown an arrangement similar to that of FIG. 1. Only one dual-mode mobile station 24 is shown for purposes of simplicity, it being understood that a plurality of such dual mode terminals may be serviced by the WLAN 14.

User terminal 24, when within the range in the WLAN environment 14 and operating in the WLAN mode 24a, registers with WLAN 20, at step S1. WLAN 20, at step S2, then registers, with UMTS repeater 18, the user identification (ID) of terminal 24 for the UMTS service watch, the user ID being transferred to UMTS repeater 18. The UMTS receiver 26 is tuned for any services addressed to registered IDs. When a UMTS service such as a page, short message service (SMS), multimedia message service (MMS) or the like is to be delivered, UMTS 12, at step S3, transfers such a service, in the example given, a page message, to UMTS repeater 18. The repeater 18, which includes a transmission tower 28 (see FIG. 1), transmits the page message over a radio channel 30 to the WLAN 20, at step S4. The WLAN format converter 22 converts the UMTS format of the page message into a WLAN message format, at step S5, having received the page message transmitted over the UMTS transmission tower 28 through wireless channel 30 and WLAN receiver antenna 32.

Format converter 22, at step S6, transfers the WLAN message format to WLAN 20 which, through converging layer 34 (FIG. 1), directs the message to the appropriate access point(s) to provide UMTS service notification over the WLAN coverage area 14, the broadcast message being transmitted to those registered users operating in the WLAN mode 24a, typically through a transmission antenna, not shown for purposes of simplicity.

The above procedure applies to the delivery of short message service (SMS), multimedia message services (MMS), broadcast and unidirectional multicast services.

What is claimed is:

1. A method for communicating messages from a universal mobile telecommunications system (UMTS) to a mobile station operating within a wireless local area network (WLAN), the mobile station configured to selectively operate in the UNITS and the WLAN environments, the method comprising:
    a) said mobile station registering with the WLAN and providing its identification (ID);
    b) a UMTS repeater retaining a user identification (ID) of the mobile station received from the WLAN and identifying the mobile station as being within a service range of the WLAN;
    c) said UMTS repeater transmitting any UMTS service addressed to the registered mobile station to the WLAN; and
    d) the WLAN converting the service message into a WLAN message format and transmitting the reformatted message to the mobile station.

2. The method of claim 1 wherein the service message of step (c) includes transmitting one of a paging message, short message service (SMS) and multimedia message service (MMS).

3. The method of claim 1 wherein step (d), comprises:
transferring the reformatted message to a given access point in the WLAN for transmission to the UE.

4. The method of claim 1 wherein
said mobile station selects the WLAN mode to receive the message created at step (d).

5. Apparatus for communicating message services to a mobile station (UE) operating in a wireless local area network (WLAN) from a universal mobile telecommunications system (UMTS), said UMTS comprising:
said UE including means for registering the UE identification (UE ID) with said WLAN;
said WLAN registering the UE ID with said UMTS;
a UMTS repeater; and
means for transmitting UMTS services to a plurality of mobile stations;
said UMTS repeater including means tuned to receive services from said means for transmitting services addressed to mobile stations registered with said UMTS repeater and means for transmitting the UMTS services to said WLAN; and
said WLAN having a format converter for converting a service received from the UMTS repeater means for transmitting into a WLAN message format and means for transmitting the reformatted message to a mobile station registered with the UMTS.

6. The apparatus of claim 5 wherein said WLAN includes means to convey said message intended for the mobile station serviced by said WLAN to an access point associated with the mobile station.

7. The apparatus of claim 5 wherein said mobile station is a dual mode station capable of operating in a UMTS mode and a WLAN mode.

8. The apparatus of claim 5 wherein said mobile station includes means for transmitting its UE ID to an access point (AP) of said WLAN to register its UE ID; and
said WLAN conveying the UE ID to said UMTS repeater for registering the UE with said UMTS.

9. A system for communicating message services to a mobile station (UE) operating in a wireless local area network (WLAN) from a universal mobile telecommunications system (UMTS), the UE configured to selectively operate in the UMTS and the WLAN environment, said system comprising:
said UE comprising:
means for registering said UE identification with said WLAN;
said WLAN comprising:
means for registering the UE ID with said UMTS;
said UMTS comprising:
a UMTS repeater for retaining at least the identity (ID) of said UE operating in said WLAN and for forwarding messages addressed to said UE of the WLAN in which the UE is operating; and
said WLAN further comprising:
a format converter for converting messages received from the UMTS repeater into a WLAN message format; and
means for transmitting the formatted messages to said UE.

10. The system of claim 9 wherein said WLAN further includes means to convey a message intended for the UE serviced by said WLAN to an access point associated with the mobile station.

11. The system of claim 9 wherein said mobile station is a dual mode station capable of operating in a UMTS mode and a WLAN mode.

12. The system of claim 9 wherein said UE includes means for transmitting said ID of the UE to an access point (AP) of said WLAN,
whereby said WLAN conveys the registered user ID to said UMTS repeater for registering the UE with said UMTS.

* * * * *

UNITED STATES PATENT AND TRADEMARK OFFICE
CERTIFICATE OF CORRECTION

PATENT NO. : 7,035,242 B2 Page 1 of 1
APPLICATION NO. : 10/302143
DATED : April 25, 2006
INVENTOR(S) : Shaheen et al.

It is certified that error appears in the above-identified patent and that said Letters Patent is hereby corrected as shown below:

At column 1, line 12, after the word "filed", delete "Jul. 9," and insert therefor --Jul. 29,--.

At claim 1, column 2, line 54, after the words "in the", delete "UNITS" and insert therefor --UMTS--.

Signed and Sealed this

Twenty-sixth Day of December, 2006

JON W. DUDAS
*Director of the United States Patent and Trademark Office*